United States Patent [19]

Keown

[11] 4,143,350

[45] Mar. 6, 1979

[54] SIGNAL ENHANCEMENT SYSTEM

[75] Inventor: John D. Keown, Haycock Township, Bucks County, Pa.

[73] Assignee: The United States of America as represented by the Secretary of the Navy, Washington, D.C.

[21] Appl. No.: 126,373

[22] Filed: Mar. 19, 1971

[51] Int. Cl.² .......................................... H04G 11/00
[52] U.S. Cl. ................................. 340/5 R; 340/6 R; 324/77 A; 343/5 SA
[58] Field of Search ................... 340/6 R, 16 R, 5 R; 324/77 B, 77 A; 181/0.5 A; 343/5 SA

[56] References Cited
U.S. PATENT DOCUMENTS

| | | | |
|---|---|---|---|
| 3,344,881 | 10/1967 | White | 340/6 R |
| 3,656,097 | 4/1972 | Massa | 340/5 R |
| 3,790,927 | 2/1974 | Chwastyk | 340/5 R |

OTHER PUBLICATIONS

Protter & Morrey, *College Calculus with Analytic Geometry*, Addison-Wesely Publ., 1966.

*Primary Examiner*—Howard A. Birmiel
*Attorney, Agent, or Firm*—R. S. Sciascia; Henry Hansen

[57] ABSTRACT

A signal enhancement method and apparatus including a computer arranged to process underwater signals at discrete spectral intervals for facilitating spectral signature recognition of submarines. An average of the spectral intensities of broadband noise on either side of the discrete spectral interval is computed and then subtracted from the spectral intensities of the specific narrow-band frequencies generated by the submarine, thereby eliminating any false combinations of nonrandom sidebands with random background noise. The remainder is then integrated with time producing a continuously increasing cumulative energy level of the discrete spectral interval when the energy thereof is originating from the submarine.

3 Claims, 3 Drawing Figures

SIGNAL ENHANCEMENT SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to acoustic signal processing systems, and more particularly to method and apparatus for enhancing a nonrandom underwater acoustic signal against the ambient, random background noise existing in a sea environment.

As is well known the sound waveforms generated by a man-made object, such as a submarine, having the characteristics of being relatively constant with time and of low variance, i.e., generally not normally distributed either in frequency or intensity when measured over short intervals. In contrast the background noise existing naturally in a sea environment is typically high random having large variances both in intensity and frequency content. In fact it can be postulated that given a sufficiently large volume of ocean the sum of the noise generated therein will closely approximate normal or Gaussian characteristics in the absence of any man-made noise. This postulate is possible even if individual noise generators existing naturally in the ocean such as fish are each characterized by nonnormal distributions, since when they are cumulated the distribution of their nonnormality is random and consequently their sum is normal. Thus, on the basis of this postulate it can be concluded that by integrating with time the total sound generated naturally in the ocean the integral will tend to converge on zero while the nonnormal or nonrandom man-made sound will tend to accumulate a nonzero value. Various techniques in the prior art have taken advantage of this fact in providing data reduction techniques identifying an azimuth of a man-made signal against the random background of the sea by integrating with time the sound emanated along a given vector thus providing the means of searching out the azimuth position of the man-made source. Some of these techniques additionally break the sound up into its spectral components providing even more signal enhancement in view of the tendency of man-made sources to have distinct spectral signatures. In this manner a very low signal-to-noise ratio can be processed in order to identify and locate an object like a submarine within a large volume of ocean.

The above techniques, however, are limited in their resolution due to the existence of low intensity sidebands usually accompanying any high intensity narrow-band source, which can locally combine with nonnormal sources existing naturally in the sea such that, over extended integration, false signature and target coordinates are produced. Specifically, it is the non-Gaussian character of this broadband noise emanated by a submarine which can bias the integral of the noise background, thereby resulting in a nonzero integral that is limiting the resolution of the signature. This broadband noise is generally insufficient in intensity to be resolved against the background, even over extended integration intervals, consequently it can combine on either side of a given azimuth with short period nonrandom noise existing naturally forming a false azimuth location.

SUMMARY OF THE INVENTION

Accordingly, it is the general purpose and object of the present invention to provide method and apparatus for eliminating the broadband noise generated by a submarine from the enhancement process of its narrow-band signals.

This and other objects are accomplished within the present invention by providing a running average computer which produces an output averaged over a wide band of frequencies that is subtracted from the specific narrow-band frequencies generated by the man-made object. What remains is a signature comprising the characteristic high intensity bands associated with any man-made object without the low intensity broadband signature, such that when each frequency is integrated with time only the real distinct frequencies will appear. Specifically, the present invention obtains the sound propagating along a given azimuth by providing two orthogonally vectored sensors, together with an omnidirectional sensor, wherein the vectored sensors are referenced to a given azimuth angle such as North. The output of the sensors provides the necessary readings to obtain a discrete sound source along any azimuth position. The inventive technique of this signal enhancement is arranged to be functionally compatible with the processes of a general purpose computer thus allowing for data reduction on readily available systems.

DESCRIPTION OF THE PREFERRED EMBODIMENT

Figure 1:
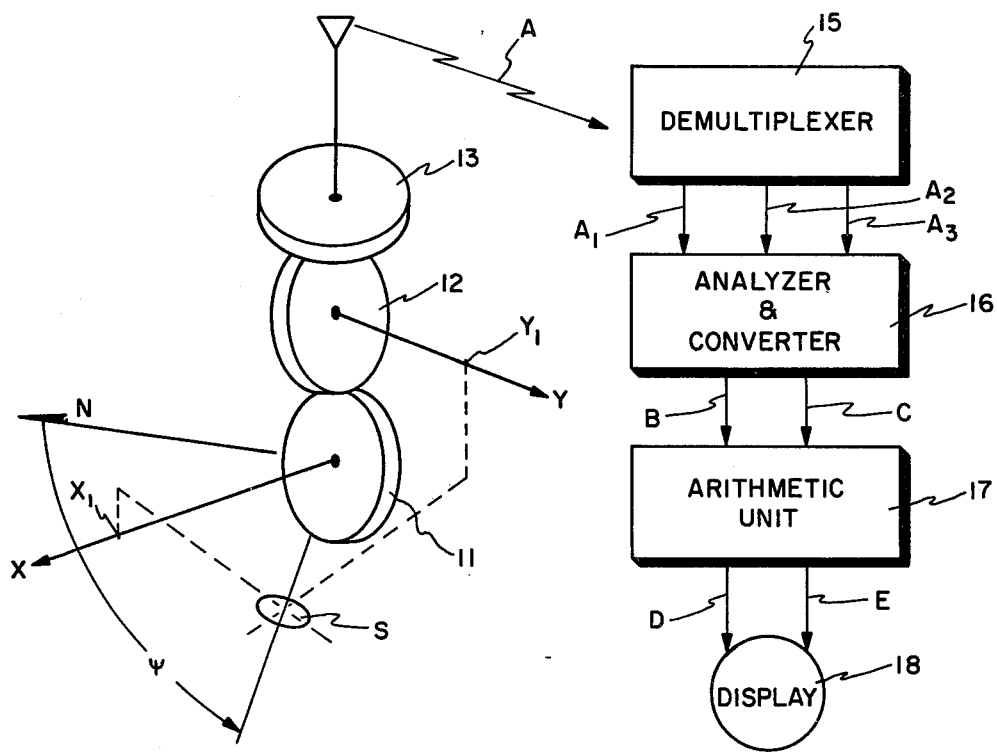
FIG. 1 is a block and schematic diagram of a signal enhancement system according to the present invention.
Figure 2:
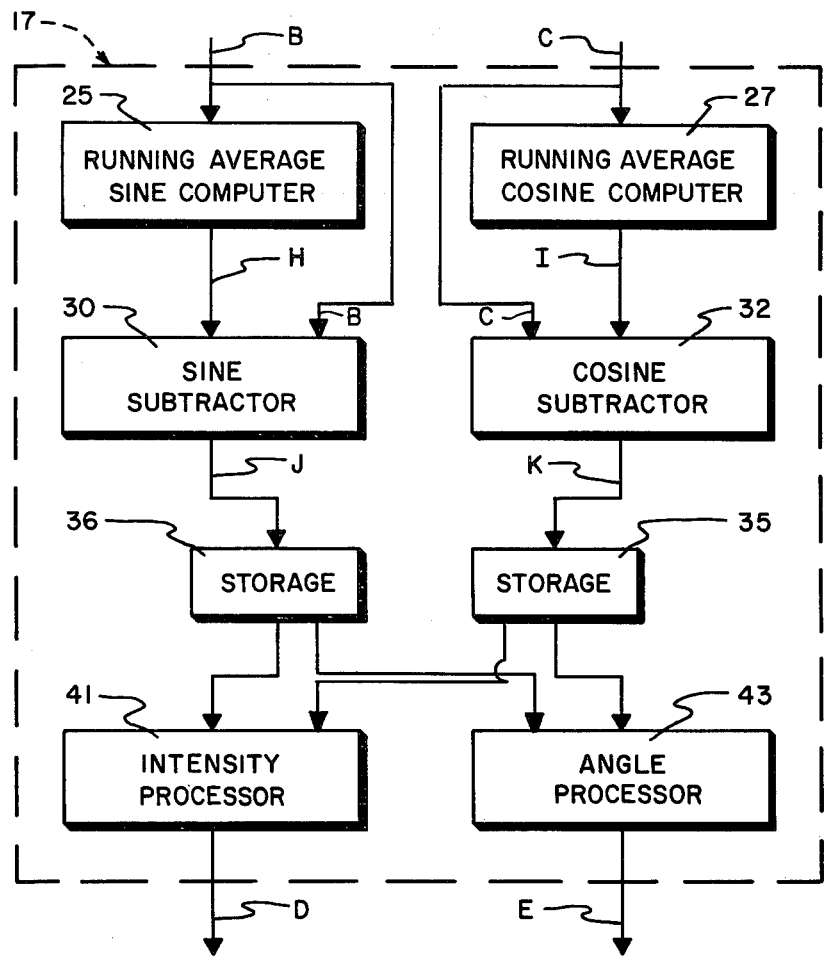
FIG. 2 is a more detailed block diagram of an arithmetic unit of FIG. 1.

Referring now to FIG. 1 there are two orthogonally vectored acoustic sensors 11 and 12 and an omnidirectional acoustic sensor 13 receiving sound emanated by a Source S. Source S is arbitrarily shown located in a horizontal plane between the respectives axes X and Y which are aligned along the lobe centers of sensors 11 and 12 respectively. The horizontal plane coordinates of source S are $x_1$ and $y_1$. Axes X and Y are shown referenced with respect to an azimuth N which, for example, can be the local magnetic North azimuth. The source S in turn is referenced against axes X and Y by comparing the sensor 11 and 12 signals with the omnidirectional sensor 13 signal. The resolution of source S into the reference coordinate system, such as an angle $\psi$ in a North referenced system, can be accomplished by any known means in the art such as cosine resolvers. The combined outputs of sensors 11, 12 and 13 are telemetered in multiplexed form on signal A to a demultiplexer 15. Demultiplexer 15 generates a total intensity (omnidirectional) signal $A_1$, a North-South intensity signal $A_2$ and an East-West intensity signal $A_3$ all of which are fed in parallel to an analyzer and converter 16. Analyzer and converter 16 includes any conventional means for spectral analysis of the signals $A_1$, $A_2$ and $A_3$ providing serially encoded digital signals B and C respectively indicative of the amplitude sine $\psi$ and amplitude cosine $\psi$ of each spectrum which are connected to an arithmetic unit 17. Within arithmetic unit 17, as shown in FIG. 2, channels B and C are respectively fed to a running average sine and cosine computers 25 and 27. The sine computer 25 and cosine computer 27 continually calculate an intensity average for an equal number of frequency increments m on each side of the frequency increment k presently sampled according to the following relationship:

$$\mu \sin \Psi_{kj} = \frac{1}{2m} \sum_{i=k-m}^{k+m} (1 - \delta_{ik}) A_{ij} \sin \Psi_{ij} \quad (1)$$

where:

$A_{ij}$ = intensity of the i'th increment or spectrum of frequency at the j'th increment of time;

$\delta_{ik}$ = diagonal unit matrix of i rows and k columns;

$\mu$ = running average of amplitude of all frequency spectra other than the k'th frequency spectrum;

$\psi_{ij}$ = angle from North of the i'th frequency increment at the j'th time increment;

$\psi_{kj}$ = angle from North of the k'th sample frequency increment at the j'th time increment; and wherein.

subscript i denotes frequency increments or spectra;

subscript j denotes time increments; and subscript k denotes the sampled frequency increment.

Similarly, the cosine computer 27 computes the running average of the cosine of the power spectrum intensity according to the relationship:

$$\mu \cos \Psi_{kj} = \frac{1}{2m} \sum_{i=k-m}^{k+m} (1 - \delta_{ik}) A_{ij} \cos \Psi_{ij} \quad (2)$$

Accordingly, $\mu \sin \psi_{kj}$ and $\mu \cos \psi_{kj}$, corresponding to signals H and I, respectively, and $A_{kj} \sin \psi_{kj}$ and $A_{kj} \cos \psi_{kj}$, corresponding to signals B and C, respectively, connect the sine computer 25 with a sine subtracter 30, and the cosine computer 27 with a cosine subtracter 32. Sine subtracter 30 generates a signal J indicative of the result obtained according to the relationship:

$$b_{kj} \sin \beta_{kj} = A_{kj} \sin \psi_{kj} - \mu \sin \psi_{kj} \quad (3)$$

where $b_{kj}$ = the net intensity of the k'th frequency spectrum at time j;

$\beta_{kj}$ = azimuth of the k'th frequency spectrum at time j;

$A_{kj}$ = gross intensity of the k'th frequency spectrum at time j;

$\Gamma_{kj}$ = azimuth of $A_{kj}$; and $\mu \sin \psi_{kj}$ = signal H from computer 25.

Similarly, cosine subtractor 32 forms a relationship:

$$b_{kj} \cos \beta_{kj} = A_{kj} \cos \psi_{kj} - \mu \cos \psi_{kj} \quad (4)$$

providing a signal K corresponding to $b_{kj} \cos \beta_{kj}$. Signals J and K, respectively are fed to storages 35 and 36 where the signals J and K are stored until output to an intensity processor 41 and angle processor 43. Intensity processor 41 produces the absolute value of the sums of signals J and K according to the relationship:

$$\overline{B}_k = \sqrt{(\sum_{j=t_1}^{t_2} b_{kj} \cos \beta_{kj})^2 + (\sum_{j=t_1}^{t_2} b_{kj} \sin \beta_{kj})^2} \quad (5)$$

providing a summation of intensities of spectral increment k over time increment j equal to $t_1$ and $t_2$. Angle integrator 43 calculates a $\overline{\theta}_k$ angle corresponding to the resolved sum of all intensities at frequency interval k summed over time interval $t_1$ through $t_2$ according to the following ratio $$\overline{\theta}_k = \tan^{-1} \frac{\sum_{j=t_1}^{t_2} b_{kj} \sin \beta_{kj}}{\sum_{j=t_1}^{t_2} b_{kj} \cos \beta_{kj}}. \quad (6)$$

The intensity $\overline{B}_k$ and the angle $\overline{\theta}_k$ are respectively generated as signals D and E from corresponding processors 41 and 43 providing the angular and intensity coordinates for the display 18. It is to be noted that although the elements in unit 17 are shown functionally separated, it is contemplated within the present invention that they comprise individual routines within a general purpose computer.

Figure 3:
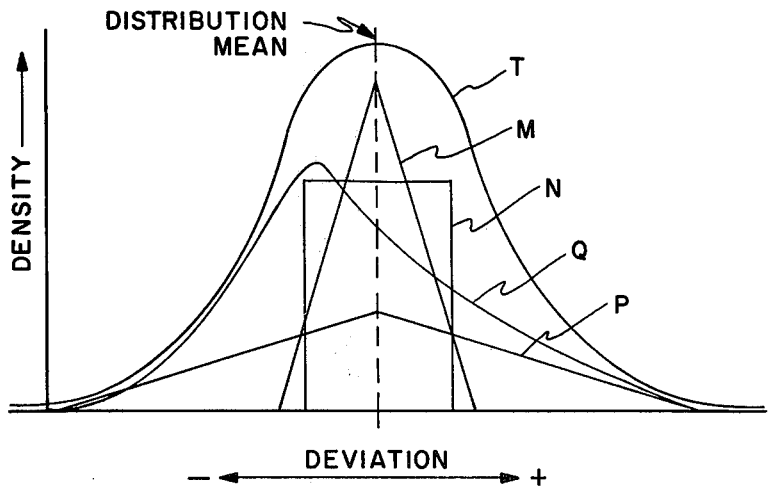
FIG. 3 is a graphical representation of the summation of several nonnormal noise distributions as applied to the present invention and forming a normal or Gaussian distribution.

Referring to FIG. 3 the principle of the present invention is illustrated wherein a Gaussian distribution T is formed by summing various non-Gaussian distributions shown as curves M, N and P. Curves M, N and P illustrate symbolically the plurality of various nonnormal short term distributions existing naturally at any one instance of time which when summed form a normal distribution T around a mean value. A skewed curve Q is shown representing the sideband spectra of the man-made source S of a density level approximately equal to the average density of the component curves M, N and P. Accordingly, inclusion of curve Q will tend to bias or deform curve T resulting in a nonrandom or nonzero solution. Generally it can be postulated that the background or ambient noise consisting of a large sum of curves like M, N and P is random and the instantaneous amplitude vectors thereof cannot be specified in time with the result that when calculated the likelihood of the deviation is equal on either side of the mean and consequently the summation thereof is zero around the mean. A man-made source, on the other hand, is relatively invariant such that its summation is nonzero over finite time increments producing false signals. Thus over finite integration intervals the skewed curve Q combines with various short term nonnormal ambient sources to produce both a false spectral signature as well as a false vector $\psi$. Curve Q is insufficient in intensity to be resolved by integrating alone against the strength of the background noise and is generally broadband such that any increment or spectrum thereof will closely approximate the average intensity. Thus when subtracted from the average the net value thereof is approximately zero leaving the narrow-band high intensity spectra for observation.

In operation sensors 11, 12 and 13 detect the sound emanated by source S together with the background acoustic noise and transmit the noise in multiplexed form on one signal A wherein the vectored signals are resolved against a North reference. Resolution with reference to a known azimuth is necessary due to the lack of adequate fixing techniques in typical sea applications where the platform containing the sensors is free and is subject to angular perturbation. Thus, resolution according to well-known resolver techniques is contemplated. Demultiplexer 15 receives signal A and separates out an omnidirectional or total intensity signal $A_1$, a north-south signal $A_2$ and an east-west signal $A_3$. Signals $A_1$, $A_2$ and $A_3$ are combined in analyzer and converter 16, spectrally analyzed, converted into digital form and output in the form of $A_{ij}\sin\psi_{ij}$ and $A_{ij}\cos\psi_{ij}$ corresponding to a north-south and east-west signals respectively shown as signals B and C. In this manner by comparing against the total intensity of signal $A_{ij}$ a signal vector $\psi_{ij}$ is obtained in the process of resolving the vectored sensors 11 and 12. At the same time in order to enhance the frequency sample k under inspection from the sideband combinations a running average of spectral energy is computed for frequency intervals m on either side of the k'th frequency sample. Accordingly, the k'th sample of frequency is floated with respect to a reference $\mu$ in subtracters 30 and 32. The spectral data generated in this manner is bipolar, having possible negative values and is converted to absolute form in intensity processor 41.

Some of the many advantages of the present invention should now be readily apparent. The invention provides a technique for eliminating low intensity sidebands of a man-made source from the calculation thereby eliminating processing of signals having very low signal-to-noise ratio. In this manner only the relatively distinct spectral components of the source are processed producing a relatively accurate result.

Obviously many modifications and variations of the present invention are possible in the light of the above teachings. It is therefore to be understood that within the scope of the appended claims the invention may be practiced otherwise than as specifically described.

What is claimed is:

1. An apparatus for enhancing a continuous analog signal indicative of noise emanated by a sound source and random background, comprising, in combination:

sensing means formed to receive the noise signal for providing three analog signals, two being indicative of the amplitude along two orthogonal vectors and one being indicative of the omnidirectional amplitude;

analyzing means operatively connected to continuously receive said analog signals for sequentially analyzing the frequency spectra of the analog signals and producing thereby two digitally encoded output signals indicative of the amplitude sine and amplitude cosine of the two orthogonal vector signals, respectively, for each frequency spectrum; and arithmetic means including computer means connected to receive said analyzing means output signals for producing output signals indicative of the running averages thereof, and subtracter means receiving the computer output signals and the analyzing means output signals for producing and storing signals indicative of the differences in amplitude for producing an output signal indicative of a net integrated intensity of the analyzing means output signals.

2. Apparatus for enhancing a continuous random signal according to claim 1 further comprising:

said arithmetic means further including processor means connected to receive said subtracter means difference signals for producing output signals indicative of the integrated intensity of said difference signals and the corresponding angles thereof.

3. Apparatus for enhancing a continuous nonrandom signal according to claim 2 wherein:

said running average computer means comprising a digital computer arranged to solve algorithms of the form $$\mu\sin\Psi_{kj} = \sum_{i=k-m}^{k+m} (1 - \delta_{ik}) A_{ij}\sin\Psi_{ij}$$

and $$\mu\cos\Psi_{kj} = \sum_{i=k-m}^{k+m} (1 - \delta_{ik}) A_{ij}\cos\Psi_{ij}$$

wherein $A_{ij}$ = amplitude of an i'th frequency spectrum at a j'th increment of time $\delta_{ik}$ = diagonal unit matrix of i rows and k columns $\mu$ = running average of amplitude of all frequency spectra other than the k'th frequency spectrum $\psi_{ij}$ = angle from a North reference of the i'th frequency increment at the j'th time increment and m = frequency increments on each side of the frequency increment k wherein subscript i denotes frequency increments of spectra subscript j denotes time increments and subscript k denotes a selected frequency increment.

* * * * *